United States Patent [19]
Nyholm

[11] Patent Number: 5,632,586
[45] Date of Patent: May 27, 1997

[54] AUTOMATIC TWISTLOCK

[76] Inventor: Ture Nyholm, 37 Seaview Road, Tennyson SA 5022, Australia

[21] Appl. No.: 513,267

[22] Filed: Aug. 10, 1995

[30] Foreign Application Priority Data

Aug. 18, 1994 [AU]  Australia .................................. PM7542

[51] Int. Cl.$^6$ .................................. F16B 21/00; B25G 3/00
[52] U.S. Cl. .............................. 411/552; 411/553; 403/348
[58] Field of Search ..................................... 411/349, 549, 411/551, 552, 553; 403/348, 350

[56] References Cited

U.S. PATENT DOCUMENTS

| | | | |
|---|---|---|---|
| 4,400,856 | 8/1983 | Tseng | 403/348 X |
| 4,591,307 | 5/1986 | Clive-Smith | 403/348 X |
| 4,732,505 | 3/1988 | Gloystein | 403/348 |
| 5,062,752 | 11/1991 | Takaguchi | 411/552 X |
| 5,155,960 | 10/1992 | Shaanan | 403/348 X |

FOREIGN PATENT DOCUMENTS

595565  2/1978  Switzerland .................. 411/552

*Primary Examiner*—Neill R. Wilson
*Attorney, Agent, or Firm*—Merchant, Gould, Smith, Edell, Welter & Schmidt, P.A.

[57] ABSTRACT

The twistlock comprises a housing with a shaft journalled into the housing with a cone formed on a first end of the shaft protruding from a top of the housing. The cone biseing elongate radially for passage through a first elongate slot of an upper container corner casting. An upper surface of the cone is bevelled so that sides of the first elongate can force the cone and shaft to rotate from a locked position to an unlocked position to enable passage through the first elongate slot, and a lower surface of said cone being bevelled so that the sides of the first elongate slot can force the cone and shaft to rotate from the locked position to the unlocked position. The shaft is biased by a spring into the locked position. A protrusion extending from a bottom of a central portion of the housing and comprises first, a part dimensioned to pass through a second elongate slot in the lower container casting and shaped allow at least some rotation within the second elongate slot, and a second part of the protrusion including two tongues diagonally opposed. The extremities of the tongues are positioned such that the protrusion can fit through said second slot in a first rotational position. Once the second part has passed through the elongate slot into the corner casting, the housing can be rotated to a second rotational position where a respective upper surface of the two tongues bear against diagonally opposed surfaces of the inside of the casting adjacent said slot.

16 Claims, 6 Drawing Sheets

AUTOMATIC TWISTLOCK

FIELD OF THE INVENTION

This invention relates to a twistlock having a single cone that is automatic in operation, such that generally vertical forces on the cone of the twistlock can be used both to lock a container in place as well as to unlock the container.

BACKGROUND OF THE INVENTION

Twistlocks are devices that are used in transport, and are commonly used with shipping containers conforming to ISO regulation (International Standards Organisation). Such twistlocks are predominantly used in shipping where the twistlocks interlock between corner castings of two adjacent containers, or in shipping or rail freight where containers are fixed to fixed castings provided on rail carriages or the deck of a ship. Other uses also exist. Where the term corner casting or container casting are used in this specification they are intended to refer to castings of the type found on corners of shipping container, or fixed on a surface for interconnection with such containers.

Twistlock have traditionally taken the form of a housing, through which a shaft extends joined to or formed with a respective cone on either end of the shaft and positioned on opposing sides of the housing. The cones are somewhat elongate to fit through the rectangular slot in the corner casting, and to lock within the corner casting on rotation to a position transverse to the slot. Where both cones are locked within a respective casting the two adjacent castings are locked together.

Various advances have been made in twistlocks and some of these have been directed at improving the inefficiencies of using manual twistlock. The operation of a manual twistlock requires that a longshoreman physically mounts the container, unlocks all twistlocks so that the container can be lifted off. In shipping the longshoreman then has to mount the container again, remove the twistlocks, and then unlock the container from the ground before the bottom container is removed. For loading the reverse is the case. Several proposals have been made for semi-automatic twistlocks to minimise the effort required in loading and unloading and several versions are commercially in use. These semi-automatic twistlocks facilitate loading, in that the cones are biased, for example, by the shafts being spring loaded to a locked position. The lower cones of the twistlock are placed in position either on the bottom container or the fixed casting. The container is lowered onto the cones, which are so formed that the downwards vertical force impart a rotational force on the shaft which forces the cone into a position allowing the cone to pass through a slot in the casting to the inside of the hollow casting, whereupon the cone snaps into the locked position within the container casting by reason of the torsional resistance conferred by the spring.

There is still however a considerable amount of work needed in the unloading with such semi-automatic twistlocks because a lever or other device needs to be manually actuated to keep the cone in an unlocked position, as a result each twistlock must be separately handled. It is desirable to provide an automatic twistlock that can be unloaded in a manner similar to that by which it is loaded.

One avenue for making the twistlocks automatic lies in the shape of the cones of the twistlock. Taking the top cone of a semi-automatic twistlock, the upper surface is bevelled at an angle such that when the cone is forced against the edges of the elongate slot of the corner casting, the shaft turns from a locked position to an unlocked position (i.e. aligned with the elongate slot) against a spring and on entering the corenr casting snaps into the locked position within the casting. Therefore, should the lower surface be bevelled appropriately then a similar result might be achieved. The shape of the lower surface must be trialled carefully because if the shape facilitates rotation of the cone too easily then there will be a tendency for the twistlock not to lock the container sufficiently well into place during transport, especially where two such cones exist on the same twistlock then the tendency of the twistlock to dislodge is quite high.

There has been a proposal for a twistlock that is automatic, to the extent that the locking and unlocking of an upper container is achieved by the application of downward and upward vertical forces respectively. The lower cone of the proposed twistlock has an upper surface that is substantially flat and is intended to be locked into position on a lower casting. This twistlock is suggested for use where only one container or layer of containers is to be loaded onto a fixed casting, such as for rail transport. Because the forces on containers loaded for shipping also include large vertical components these twistlocks are not appropriate for shipping activities.

The above proposal however has several disadvantages, the primary disadvantage arises as a result of rough and somewhat careless handling and the high loads that are exerted on the twistlock in view of the weight of material carded within containers. Where the container is lifted by crane or gantry onto the fixed corner castings with twistlocks in place, there is usually some sideways movement; it is rare for the corner castings of the container to engage the top cone of the twistlock with only a vertical motion. As a result it is highly likely that the twistlocks may be tilted with respect to the fixed corner casting on loading. As a result either the twistlock may become jammed in the corner casting, or the lower cone can be jammed within the lower casting, so the that top cone cannot rotate to align with the elongate slot of the casting on the container. The twistlock then needs to be physically removed, and that may not always be easy, and may result in damage to the twistlock or the corner casting.

Additionally if the lower cone of the twistlock is twisted as a result of the loading and becomes aligned with the elongate slot of the corner casting, it is possible that the twistlock may be flipped out of the lower casting.

It is an object of the present invention to provide an automatic twistlock arrangement that obviates or minimises any one of the above problems or at least provides the public with a useful choice.

SUMMARY OF THE INVENTION

In broad form, although not necessarily the only or broadest form, the invention could be said to reside in a twistlock comprising a housing, and a shaft journalled into the housing said shaft having a first end protruding from a top of the housing with a cone formed thereon said cone being elongate radially, relative to the shaft, for passing through a first elongate slot of an upper container corner casting,     an upper surface of said cone being bevelled so that sides of the first elongate can force the cone and shaft to rotate from a locked position to an unlocked position to enable passage through the first elongate slot, and a lower surface of said cone being bevelled so that the sides of the first elongate slot can force the cone and shaft to rotate from the locked position to the unlocked position, the shaft being biased to the locked position, the housing comprising a central flat portion to be positioned between the upper container casting and a lower container casting, a lower protrusion extending from a bottom of the central portion of the housing the protrusion comprising a first part closest to the central portion and being dimensioned to pass through a second elongate slot in the lower container casting and allowing at least some rotation within the second elongate slot axially with respect to the shaft, and a second part of the protrusion further from the central portion including two tongues diagonally opposed, extremities of which tongues are positioned such that the protrusion can fit through said second slot in a first rotational position, the protrusion being so configured, that once the second part has passed through the elongate slot, the housing can be rotated to a second rotational position where a respective upper surface of the two tongues bear against diagonally opposed surfaces of the inside of the casting adjacent said slot.

BRIEF DESCRIPTION OF THE DRAWINGS

For a better understanding One embodiment of the invention will now be described with reference to drawings wherein.

DETAILED DESCRIPTION OF THE DRAWINGS

Figure 1:
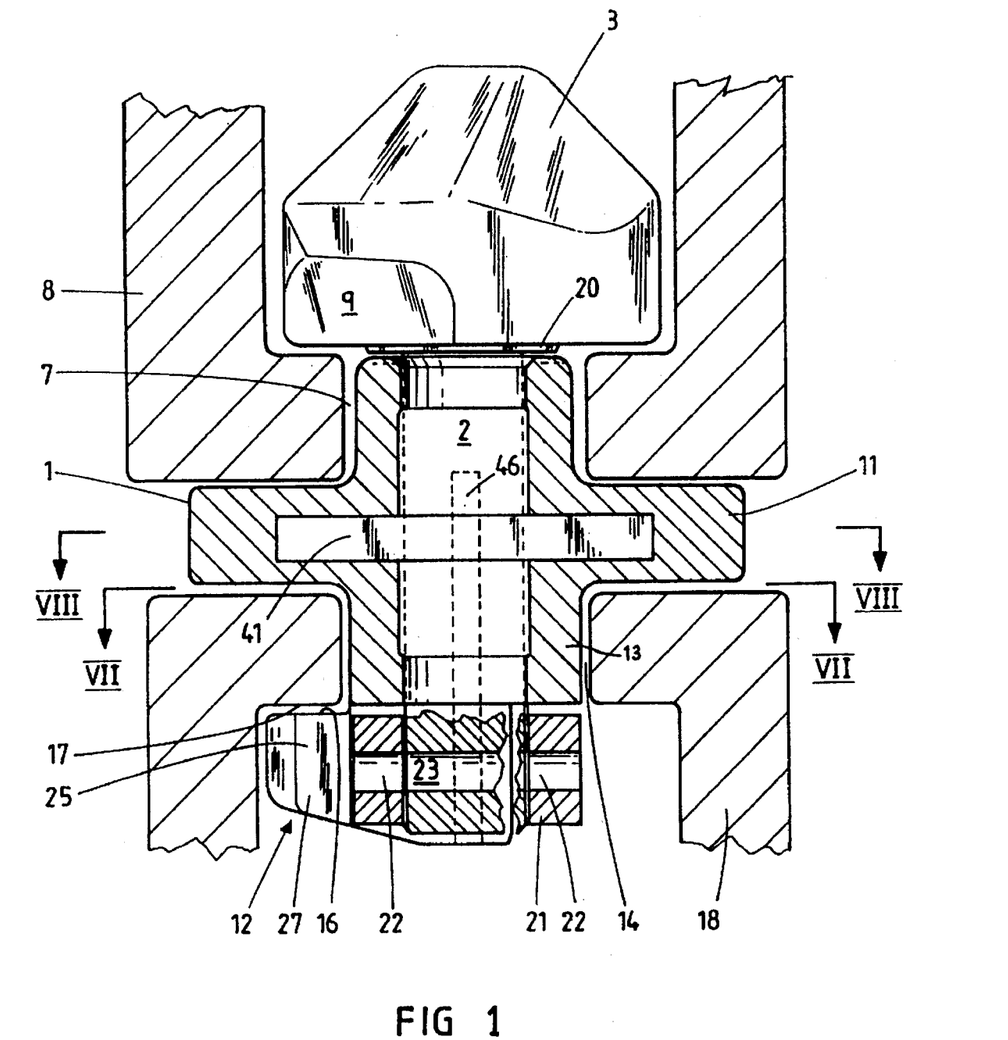
FIG. 1. Is a part cutaway sectional illustration showing the illustrated embodiment locked onto a fixed container casting, and a corner casting of a container showing generally the workings of the twistlock.

The illustrated twistlock comprises a housing 1 and a shaft 2 journalled into the housing. A cone 3 is formed onto the first end of the shaft, the cone being elongate. The upper surface of the cone is bevelled at 4, and 5 so that sides 6 of an elongate slot 7 in a container casting 8 can bear thereagainst to rotate the cone and shaft from a locked position to an unlocked position, the angle and the degree of bevel required is known in the art. The lower surface of the cone is bevelled for example at 9, so that when the cone is in the upper corner casting, the sides 6, of the elongate slot 7 in the container casting can bear thereagainst to rotate the cone and shaft from a locked position to an unlocked position. The shaft is biased by a rubber spring 10 into the locked position.

Figure 7:
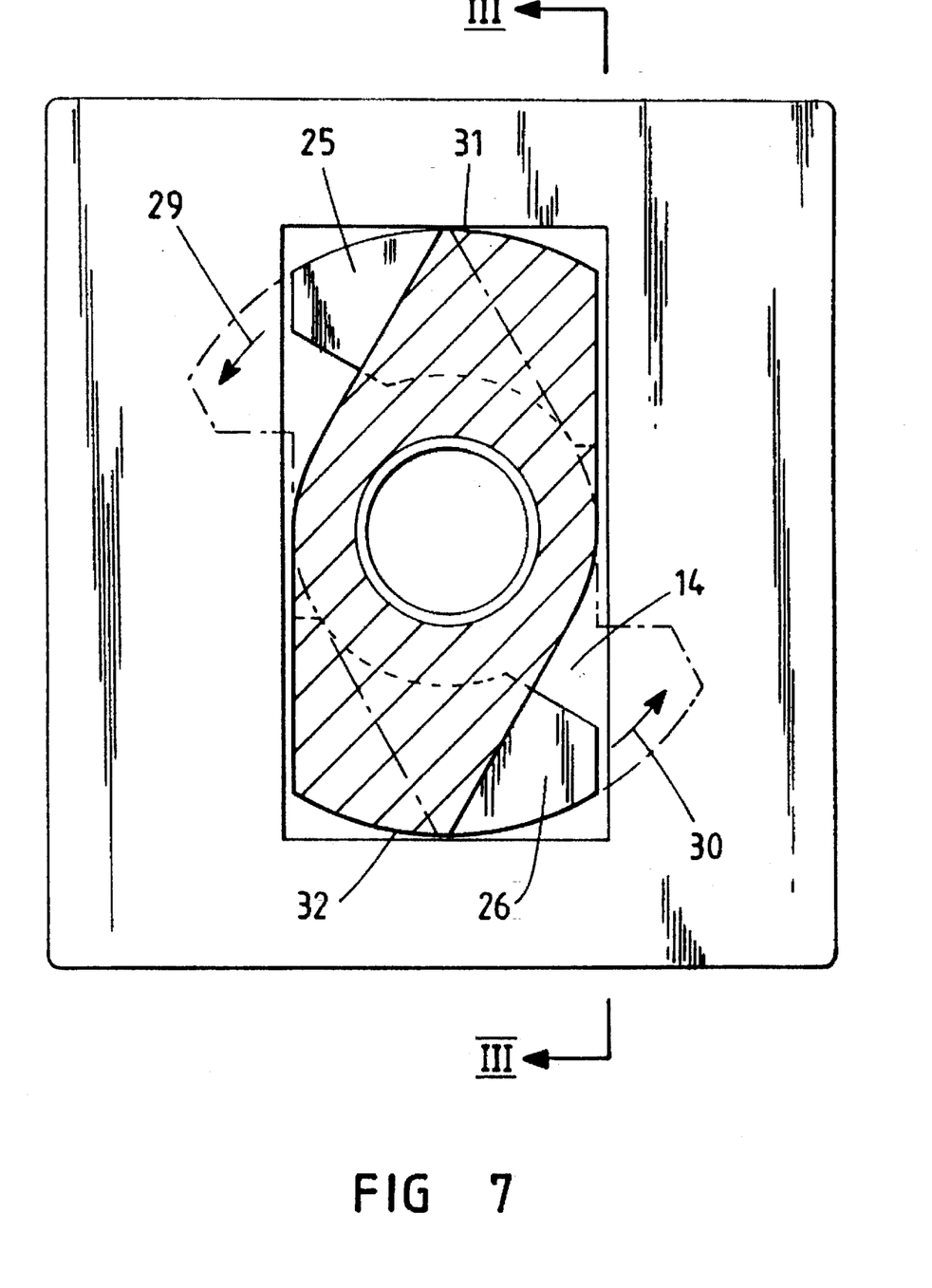
FIG. 7 is a view from VII—VII of FIG. 1 showing the lower protrusion of the housing as fitting through the elongate slot of the fixed container casting.

The housing comprises a central flat portion 11 that can be positioned between two container castings, and includes a protrusion 12 extending downwardly from the flat central portion. The protrusion comprises two parts, a first part 13, being closer to the central portion, is dimensioned so that it can fit through the slot 14 formed in a lower container casting 18, and is dimensioned to a/low for a limited rotation of approximately 30° as best seen in FIG. 7. The second part 15 of the protrusion includes two tongues 25 and 26 diagonally opposed with respect to the shaft and each has an upper surface 16 that can, on rotation of the housing, be brought to bear against an inner surface 17 of the casting adjacent the slot 14, to thereby lock the housing into place within a lower container casting. The locking prevents upward movement of the shaft.

Turning now in more detail to parts of the twistlock. The housing is cast in a single piece and is preferably cast from steel, and coated with a corrosive resistant layer such as by electroplating with zinc. Aspects of the shape of the cast housing will be explained in more detail below.

A hollow generally cylindrical aperture extends through the centre of the housing from top to bottom, to receive the shaft 2. A top end of the shaft expands to form the cone, 3, and a circular seat 20 is formed on the bottom of the cone to provide even support on top of the housing. The cylindrical aperture ends approximately where the first part 13 of the protrusion of the housing ends, and opens out into a bore defined within the second part of the protrusion. A washer 21 is positioned on the lower end of the shaft, by means of a pin (not shown) passing through aligned holes 22, 23 in the washer and the lower end of the shaft. The upper surface of the washer is aligned against the housing within the bore, the shaft being held in place by the washer 21, and the seat 20. The cone can rotate within the cylindrical aperture.

Two diagonally opposed tongues 25 and 26 extend towards diagonally opposed corners of the second slot in the lower corner casting, to minimize the amount of rotation of the housing that is required to lock the housing into the lower corner casting, as shown by arrows 29 and 30 in FIG. 7. The two tongues extend downwardly to form legs 27 and 28 which, as can be seen, are positioned on either side of the shaft and washer.

The protrusion 12 of the housing extends quite a way into the lower corner casting, and the ends 31 and 32 of the generally elongate protrusion fit closely to side walls 53,54 of the container casting. Should therefore, by chance the housing of the twistlock be twisted during engagement of the cone with a container, the twistlock will not flip out of the lower casting because legs will bear against internal side walls of the lower corner casting. In such an event the twisting effect that edges of the slots of the upper corner casting has on the cone has a general tendency to re-insert the tongues back into the locked position. Furthermore because nothing attached to the shaft engages the lower corner casting, and the shaft is shielded from contact with it, locking of the cone as a result of snagging does not occur.

The first part of the protrusion of the housing as illustrated is specifically shaped to limit the extent of rotation of the shaft. The shape of the first portion of the protrusion is generally elongate, having sides tapered inwardly to towards ends 31 and 32. The tapered side allowing limited rotation within the elongate slot of the lower corner casting, the extent of tapering defining precisely the extent of rotation, the illustrated embodiment allowing rotation of 30°, which can best be seen in FIG. 7. The lower protrusion being shown as fitting through the elongate slot of the lower container casting so that the protrusion can protrude inside of the corner casting. The housing can then be rotated to a position shown in broken outline where the tongues 25, 26 fit underneath and engage with the inner surface 17 of the casting.

It is to be understood that other means of defining the rotation may be achieved, and that the first part of the protrusion could be, for example, round. The configuration of the tongues can also be varied, especially where the first part of the protrusion were to be rounded instead of the illustrated shape it may be desired simply to have the tongue take the form of a plate extending outwardly from a central generally cylindrical body, which includes the first portion of the protrusion. The tongues need not also act to shield the shaft from the inside surfaces of the container casting. It may be desired simply to have the shaft be journalled into a bore within the housing, and not extend fully therethrough, in which case other portions of the housing shield the shaft from the internal surfaces of the corner casting. It is to be understood however that a longer shaft will provide a greater resistance to the wear that might be experienced.

Figure 2:
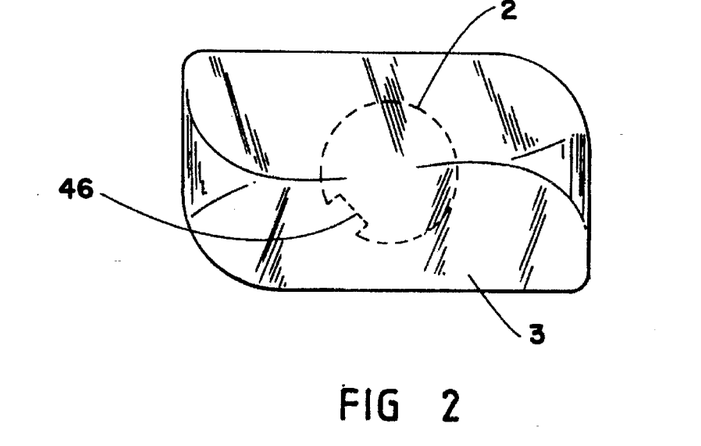
FIG. 2 is a view from above of the cone connected to the shaft, the latter being shown in broken outline.
Figure 3:
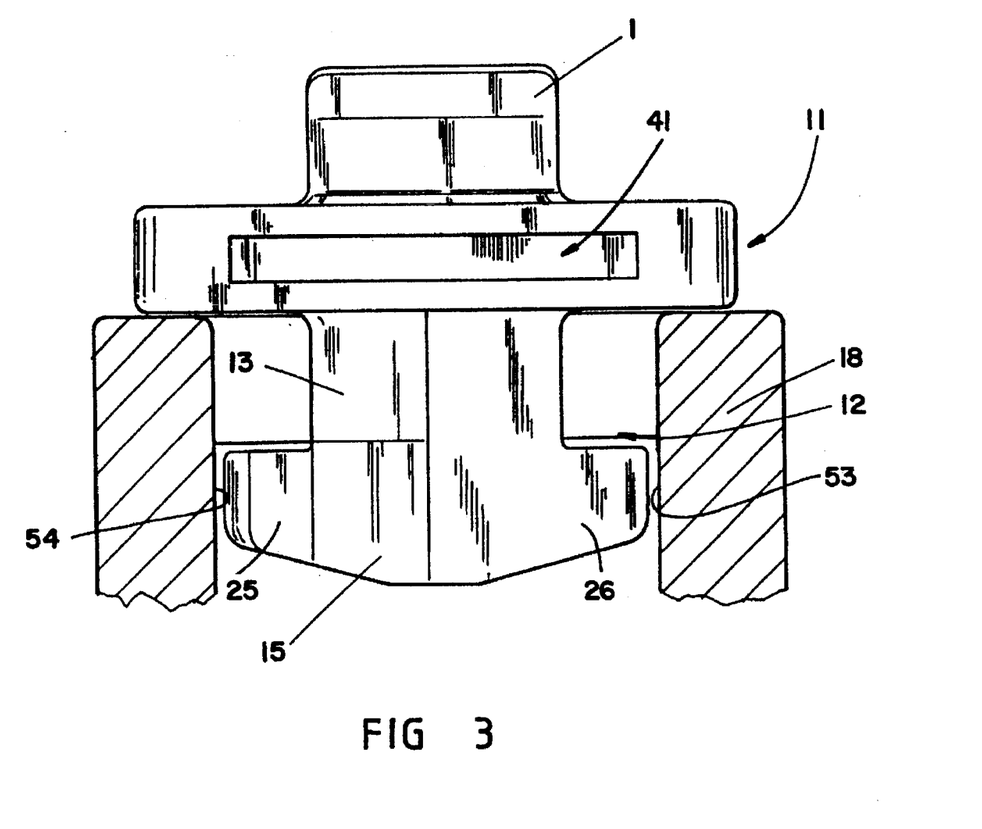
FIG. 3 is a plan view of the housing as fitting into a fixed container casting, in an unlocked position the corner casting shown in cross section, approximately as viewed from III—III in FIG. 7.
Figure 4:
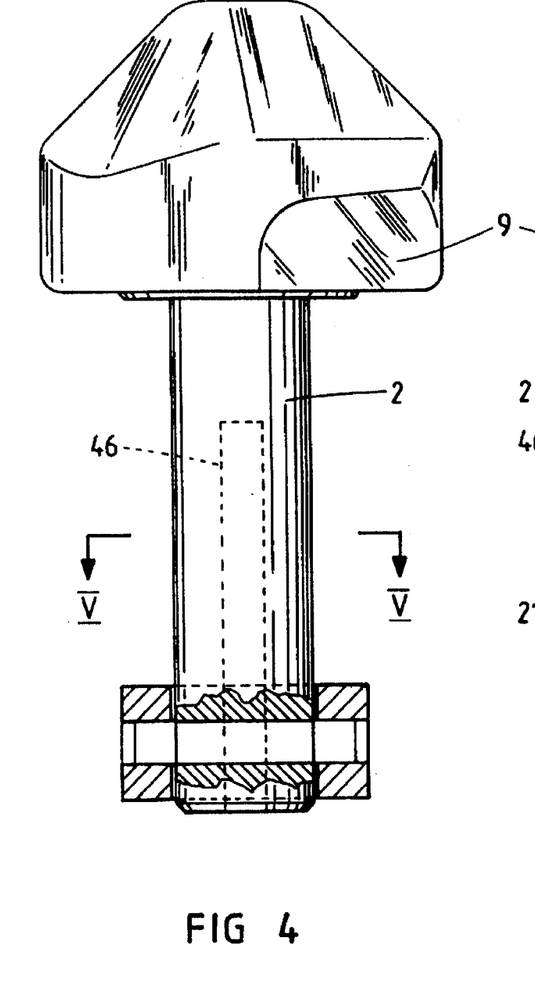
FIG. 4 is an outline of a side view of the cone, attached to the top of the shaft, the lower part shown in part cross section, with washer, shown in cross- section attached to the bottom of the shaft, with a radial bore for attaching the washer to the bore by means of a pin.
Figure 5:
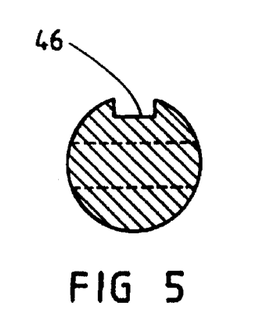
FIG. 5 shows a cross sectional view of the shaft showing the key way formed along one side, essentially as viewed from V—V in FIG. 4, but without the washer attached.
Figure 6:
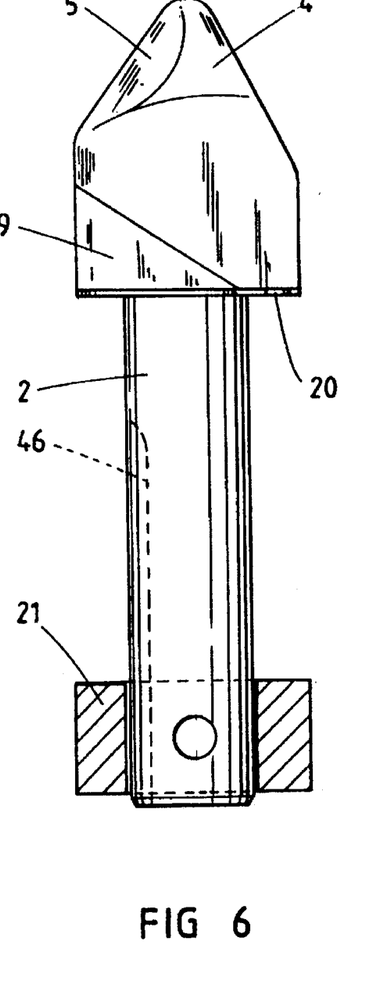
FIG. 6 is an outline of an end view of the cone attached to the top of the shaft, in similar manner to that shown in FIG. 4 but rotated through 90°.

The cone 3 located on top of the shaft is generally elongate, a top view is shown in FIG. 2, a side view shown in FIG. 4, and an end view shown in FIG. 6. The cone is integrally formed with the shaft, both of which are forged. The top surface of the cone is bevelled on both sides and so configured that when angled with respect to the upper corner casting, but not engaged therewith, downward pressure by edges of the corner casting defining the elongate slot the cone is caused to rotate. The pressure usually being supplied by the weight of the container. The lower surface of this particular cone is also bevelled at two diagonally opposed places one of which is shown at 9. Where a lifting force is exerted the same edges of the elongate slot of the corner castings bear against the cone, this time against the bevels 9 on the lower surface, to force the cone to rotate to an unlocked position, whereupon the container can be lifted off. The shape of the cone, particularly the downwardly facing surface is important because there must be sufficient resistance to rotation to prevent the container being dislodged during normal use, but it must not be so great that it is not easy to lift the container from the twistlock. The precise angle will depend on the nature and strength of the biasing means, and may be empirically determined. The biasing means provides the majority of this resistance.

Figure 8:
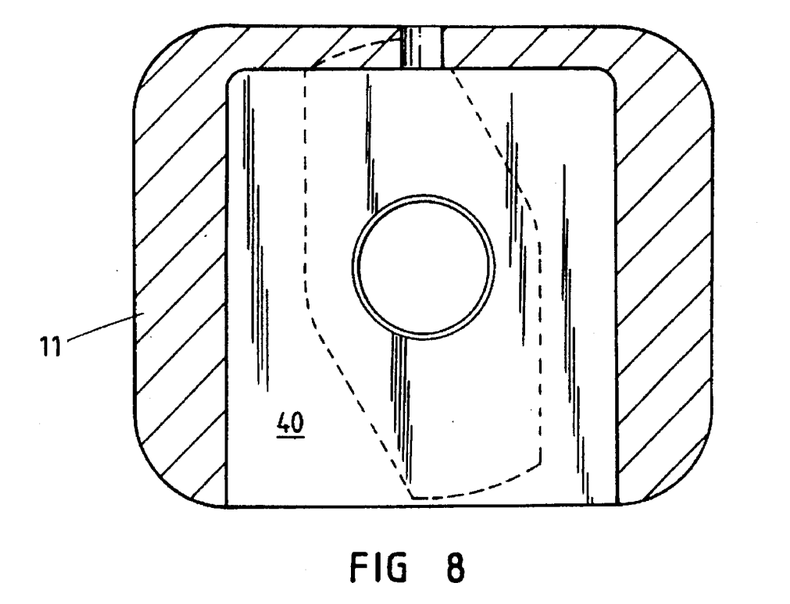
FIG. 8 shows a part cross sectional view of the central flat portion of the twistlock housing, as seen from VIII—VIII of FIG. 1.
Figure 9:
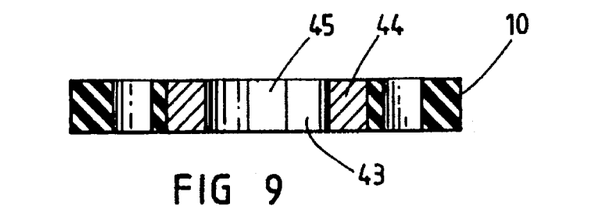
FIG. 9 shows a cross sectional side view from IX—IX of FIG. 10, but not showing the shaft of a rubber spring which inserted into the central flat portion of the housing and is keyed to the shaft of the twistlock.
Figure 10:
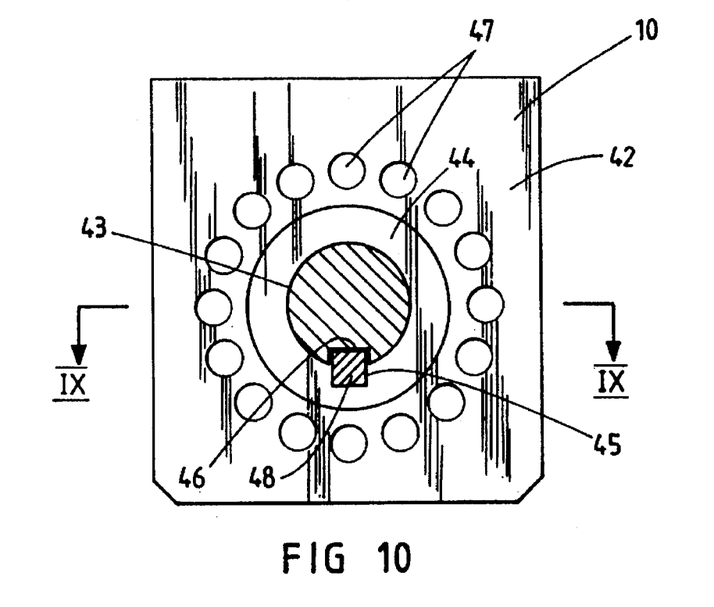
FIG. 10 shows a plan view from above of the rubber spring as keyed onto the shaft.
Figure 11:
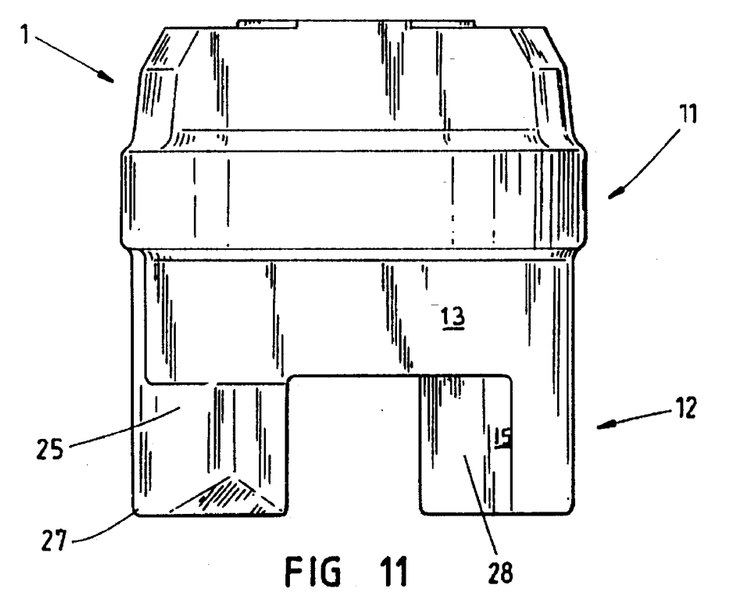
FIG. 11 is a side view of the housing when rotated 90° relative to the view as seen in FIG. 3.
Figure 12:
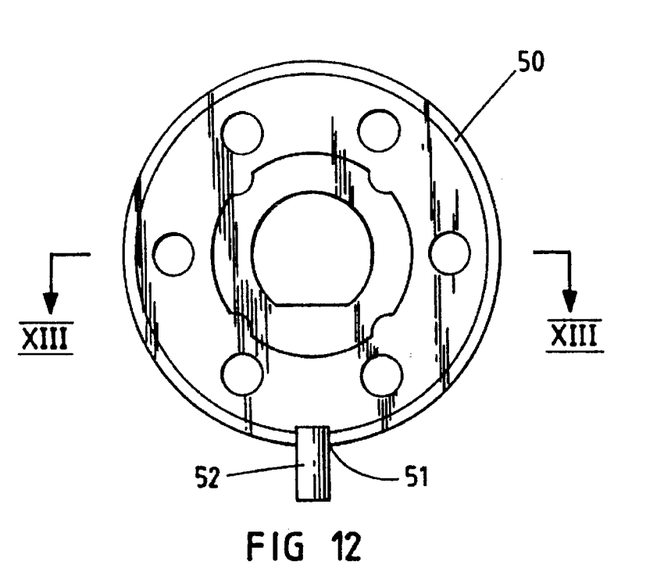
FIG. 12 shows a plan view from above of a second embodiment of the rubber spring as keyed onto the shaft.
Figure 13:
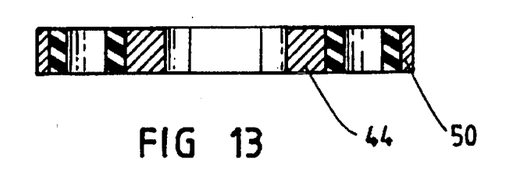
FIG. 13 shows a cross sectional side view through XIII—XIII of FIG. 12, of a second embodiment of the rubber spring.

Aspects of the biasing means used in this embodiment are best understood with reference to FIG. 8, FIG. 9, and FIG. 10. The central flat portion of the housing includes a low generally square chamber 40 that is open and forms a slot 41 in the housing. The biasing means 10 takes the form of a generally square flat block of rubber 42, formed in approximately the shape of the square chamber 40. The rubber block is fused to a metal ring 44 having a keyway 45 and an inner aperture 43. The keyway 45 is mirrored by a keyway in the shaft 46. The resilience of the rubber block can be modified by forming circumferentially spaced holes 47 in the block. When assembled sides of the square rubber block bear against sides of the square chamber, the rubber block is faced to the shaft by means of key 48. The rotation of the shaft and the cone are therefore resisted by the action of the rubber block. Should the cone be caught, it may be desired to release the rubber block, and that is difficult with the illustrated embodiment. A second embodiment, as illustrated in FIG. 12 and FIG. 13, may be beneficial in such circumstances. The rubber biasing means may be round, where a second metal ring 50 surrounds the generally round rubber ring. A threaded aperture is formed in the housing, and bore 51 is formed circumferentially in the outer metal ring, so that a dog screw 52 can be passed through the aperture in the housing and fastened therethrough to engage the bore in the metal ting. This configuration simplifies removal of the biasing means where desired. All that is required is unscrewing of the dog screw.

It is to be understood that the biasing means may take other forms, and where the distance for the centrally flat portion of the housing is not limited, steel springs may be used.

I claim:

1. A twistlock comprising a housing, and a shaft journalled into the housing said shaft having a first end protruding from a top of the housing with a cone formed thereon said cone being elongate radially, relative to the shaft, for passing through a first elongate slot of an upper container corner casting, an upper surface of said cone being beveled so that sides of the first elongate slot can force the cone and shaft to rotate from a locked position to an unlocked position to enable passage through the first elongate slot, and a lower surface of said cone being beveled so that the sides of the first elongate slot can force the cone and shaft to rotate from the locked position to the unlocked position, means for biasing the shaft, wherein the shaft is biased to the locked position, the housing comprising a central flat portion to be positioned between the upper container casting and a lower container casting, a lower protrusion extending from a bottom of the central portion of the housing the protrusion comprising a first part closest to the central portion and being dimensioned to pass through a second elongate slot in the lower container casting and allowing at least some rotation within the second elongate slot axially with respect to the shaft, and a second part of the protrusion further from the central portion including two tongues diagonally opposed, extremities of which tongues are positioned such that the protrusion can fit through said second slot in a first rotational position, the protrusion being so configured, that once the second part has passed through the elongate slot, the housing can be rotated to a second rotational position where a respective upper surface of the two tongues bear against diagonally opposed surfaces of the inside of the casting adjacent said slot.

2. A twistlock as in claim 1 wherein a stop means is provided for limiting the rotation of the first part of the lower protrusion of the housing within the second elongate slot.

3. A twistlock as in claim 2 wherein sides of the first portion of the lower protrusion are tapered from the centre, the angle of the taper defining the degree of rotation, and acting as stop means to limit the rotation of the housing.

4. A twistlock as in claim 2 wherein the stop means limits the rotational of the housing to 30°.

5. A twistlock as in claim 4 wherein sides of the first portion of the lower protrusion are tapered from the centre, the angle of the taper defining the degree of rotation, and acting as stop means to limit the rotation of the housing.

6. A twistlock as in claim 1 wherein sides of the first portion of the lower protrusion are tapered from the centre, the angle of the taper defining the degree of rotation, and acting as stop means to limit the rotation of the housing.

7. A twistlock of as in claim 1 wherein the housing comprises the central flat portion, an upper protrusion for passing through the first elongate slot, the lower protrusion for passes through the second elongate slot, the said protrusions holding the housing in position between two adjacent corner castings.

8. The twistlock as in claim 7 wherein the first part of the lower protrusion extends from the central flat portion only to a distance slightly greater than a thickness of the corner casting at the second elongate slot.

9. The twistlock as in claim 1 wherein the lower protrusion is radially elongate and dimensioned so that ends fit closely to the ends of the elongate slot, so that the said ends bear against edges of the second elongate slot on tilting of the twistlock.

10. The twistlock as in claim 1 wherein the biasing means is provided by an elastomeric spring fixed to the shaft and to the housing.

11. The twistlock as in claim 10 wherein the elastomeric spring is a flat elastomeric block fitted within the flat portion of the housing, the elastomeric spring including a central metal ting to which the elastomeric block is fused including first spring securing means to removably secure the rubber spring to the shaft, and second spring securing means to secure the rubber spring to the housing, so that relative rotation between the shaft and the housing results in circumferential twisting of the elastomeric block.

12. The twistlock as in claim 11 wherein the flat elastomeric block includes apertures passing through the flat block to modify the resistance to torsion exerted by the elastomeric block.

13. The twistlock as in claim 11 wherein the first spring securing means includes a central keyway in the central metal ring, which keyway is aligned with a keyway on said shaft, a key slotted in the keyway for maintaining the relative position of the shaft and the central metal ring.

14. The twistlock as in claim 12, the elastomeric block being circular, and the second securing means being a second metal ring secured to the periphery of the elastomeric block, and a fastener fastening between the housing and the second metal ring.

15. The twistlock as in claim 1 wherein the shaft is shielded from the lower container casting by the housing.

16. The twistlock as in claim 1 wherein a free end of the shaft protrudes beyond the central flat portion of the housing and is shielded form contact with the corner casting by the diagonally opposed tongues, each of which extend downwardly away from the first part of the lower protrusion to for two legs.

* * * * *